United States Patent
Knies et al.

(10) Patent No.: US 8,551,296 B2
(45) Date of Patent: Oct. 8, 2013

(54) PROCESS FOR PREPARING HIGH-PURITY HEXACHLORODISILANE

(75) Inventors: Wolfgang Knies, Burghausen (DE); Karin Boegershausen, Burghausen (DE); Hans Eiblmeier, Burghausen (DE)

(73) Assignee: Wacker Chemie AG, Munich (DE)

( * ) Notice: Subject to any disclaimer, the term of this patent is extended or adjusted under 35 U.S.C. 154(b) by 749 days.

(21) Appl. No.: 12/681,979

(22) PCT Filed: Oct. 7, 2008

(86) PCT No.: PCT/EP2008/063363
§ 371 (c)(1),
(2), (4) Date: Apr. 7, 2010

(87) PCT Pub. No.: WO2009/047238
PCT Pub. Date: Apr. 16, 2009

(65) Prior Publication Data
US 2010/0221169 A1   Sep. 2, 2010

(30) Foreign Application Priority Data
Oct. 9, 2007   (DE) .................. 10 2007 000 841

(51) Int. Cl.
*B01D 3/42* (2006.01)
*B01D 3/00* (2006.01)
*B01D 3/10* (2006.01)
*C01B 33/08* (2006.01)
*C01B 33/107* (2006.01)

(52) U.S. Cl.
USPC ...... 203/3; 203/71; 203/73; 203/74; 423/341; 423/342

(58) Field of Classification Search
USPC ............... 203/3, 71, 73, 74, 81; 423/341, 342
See application file for complete search history.

(56) References Cited

U.S. PATENT DOCUMENTS

| 4,390,510 A | * | 6/1983 | Ritzer et al. .................. 423/342 |
| 4,542,005 A | * | 9/1985 | Tetsuya et al. ................ 423/347 |
| 7,740,822 B2 | * | 6/2010 | Ishikawa et al. .............. 423/342 |
| 2009/0053124 A1 | | 2/2009 | Ishikawa et al. |

FOREIGN PATENT DOCUMENTS

| DE | 1142848 | | 1/1963 |
| EP | 1264798 | A1 | 12/2002 |
| GB | 923784 | | 4/1963 |
| GB | 2079736 | A | 1/1982 |
| JP | 61-275125 | A | 12/1986 |
| JP | 61275125 | A | 12/1986 |
| JP | 2006176357 | A | 7/2006 |
| WO | 2006109427 | A1 | 10/2006 |

OTHER PUBLICATIONS

Database WPI Week 198703 Thomson Scientific, London, GB; AN 1987-017719, XP002410996 & JP 61 275125 A.

* cited by examiner

*Primary Examiner* — Nina Bhat
*Assistant Examiner* — Jonathan Miller
(74) *Attorney, Agent, or Firm* — Brooks Kushman P.C.

(57) ABSTRACT

Ultra high purity hexachlorodisilane is prepared from hexachlorodisilane-containing mixtures from numerous sources by distillation wherein water is present at less than 10 ppbw.

10 Claims, No Drawings

PROCESS FOR PREPARING HIGH-PURITY HEXACHLORODISILANE

CROSS-REFERENCE TO RELATED APPLICATION

This application is the U.S. national phase of PCT Appln. No. PCT/EP2008/063363 filed Oct. 7, 2008 which claims priority to German application DE 10 2007 000 841.6 filed Oct. 9, 2007.

BACKGROUND OF THE INVENTION

1. Field of the Invention

The invention relates to a process for preparing high-purity hexachlorodisilane by distillation.

2. Description of the Related Art

EP-A 1 264 798 describes the preparation of hexachlorodisilane from the offgases from the deposition of polycrystalline silicon by distillative removal from the other chlorosilanes and process gases. GB 923 784 describes the preparation of hexachlorodisilane by thermally cracking trichlorosilane within a temperature range from 200 to 600° C., wherein the reaction must be performed under a protective gas or under hydrogen gas. DE 11 42 848 likewise describes obtaining high-purity hexachlorodisilane by heating trichlorosilane to 200 to 1000° C. in an electron burner. This reaction too is performed under protective gas or using hydrogen as the transport gas. WO-A 06109427 describes the removal of silanol from hexachlorodisilane by treatment with activated carbon, followed by a distillation. In Ultrareine Stoffe No. 4(1994), V.A. Schaligin et al. state, that in a distillation of hexachlorodisilane, the boiling point of the product should not be exceeded since a decomposition of the hexachlorodisilane would otherwise proceed.

SUMMARY OF THE INVENTION

The invention provides a process for preparing hexachlorodisilane by distilling a mixture comprising hexachlorodisilane, characterized in that water is present in the distillation in amounts of not more than 10 ppbw (parts per billion by weight).

DETAILED DESCRIPTION OF THE PREFERRED EMBODIMENTS

The mixtures which comprise hexachlorodisilane and are used in accordance with the invention comprise, as well as hexachlorodisilane, tetrachlorosilane and possibly also traces of trichlorosilane.

The mixture which comprises hexachlorodisilane preferably comprises chlorosilane mixtures which are obtained from the reaction of HCl with calcium silicide, from the reaction of chlorine with silicon, or from the process offgases from the deposition of polycrystalline silicon, more preferably process offgases obtained in the deposition of polycrystalline silicon (referred to hereinafter as "process gas"). These chlorosilane mixtures may have been treated with chlorine before or during the purification in order to convert hydrochlorosilanes to chlorosilanes, since especially hydrochlorosilanes with a relatively high hydrogen content can be self-igniting.

The chlorosilane mixtures may also be admixed with further substances, for example activated carbon or with silica preferably produced pyrolytically or by a precipitation process.

In particular, the chlorosilane mixtures contain silanols only in amounts up to <1 ppbw, if any. The formation of silanols, for example from the reaction of water with chlorosilanes, is undesired, since they can condense to disiloxanes. The formation of hexachlorodisiloxane is disadvantageous, especially since its boiling point differs only slightly from that of hexachlorodisilane and is thus difficult to remove.

The chlorosilane mixture used in the process is preferably liquid. If the chlorosilane mixture comprises process gases, it is preferably condensed before the distillation, for example by simple cooling, preferably to <20° C., more preferably to 10 to 20° C.

The inventive distillation can be effected under standard pressure, elevated pressure or reduced pressure. A decision in this respect is influenced essentially by the composition of the chlorosilane mixture. When, for example, impurities such as titanium chlorides and hexachlorodisiloxane are not present, it is possible to distill under reduced pressure.

Preference is given, however, to performing the inventive distillation under standard pressure or a minimal elevated pressure. Reduced pressure, in contrast, is not preferred, since any leaks present in the apparatus used to perform the process, in the presence of reduced pressure, can cause air with a certain moisture content from the environment to come into contact with the chlorosilane mixture.

The inventive distillation is more preferably performed at the pressure of the surrounding atmosphere, i.e. from 900 to 1100 hPa, especially from 980 to 1020 hPa.

The inventive distillation can be performed in the presence or absence of protective gas such as nitrogen, helium or argon; however, it can also be performed under air, provided that the moisture content is not more than 10 ppbw. Preferably, merely for reasons of cost, the distillation is performed in the presence of nitrogen.

In the inventive distillation, water is preferably present in amounts of not more than 5 ppbw, more preferably not more than 1 ppbw; in particular, no water is present in the distillation. This is achieved, for example, by drying the chlorosilane mixture feed. The drying can be effected by any suitable processes for drying gases and liquids. A protective gas supplied constantly during the distillation would keep adding new moisture under industrial conditions. In order to prevent this, the plant can be sealed with a pressure-equalizing valve, which releases any elevated pressure which arises to the outside, but does not permit any pressure equalization from the outside inward. The elevated pressure which arises as the plant is heated escapes, until the plant is in equilibrium. As the plant is cooled, a reduced pressure again arises, which has to be balanced out. The pressure-equalizing valve may either be a mechanical valve which opens under elevated pressure and supplies protective gas under reduced pressure, or simply a bubble counter filled with a barrier fluid. The latter, however, in the case of cooling, does not permit balancing of the reduced pressure.

The inventive distillation can be effected by any suitable method, for example by vacuum distillation or distillation under standard pressure. Preference is given to a pressure in the range from 300 to 600 mbar, and pressures in the range of <10 mbar should be avoided, since hexachlorodisilane is then volatile even at room temperature.

The term "reduced pressure" in the context of the present invention shall be understood to mean all kinds of reduced pressure known in this context by those skilled in the art, for example coarse vacuum and fine vacuum.

In the process according to the invention, the head temperature is preferably 146 to 149° C., more preferably 147 to 148° C., at a pressure of the surrounding atmosphere, i.e. preferably from 990 to 1020 hPa.

In a so-called vacuum distillation, the use of speed-controlled membrane pumps is advantageous, since these keep the vacuum at a defined level without gas ballast.

For fractional distillation, it is possible to use different designs of columns, for example columns filled with random packings, or sieve tray or bubble-cap tray columns. The distillation can be performed batchwise or continuously.

In the process of the invention, the vapor obtained is cooled to give the distillate, preferably to less than 40° C., more preferably to less than 30° C. Hexachlorodisilane is obtained in a purity of more than 99.5%.

The process of the invention has the advantage that hexachlorodisilane is obtained in high purity, and that hexachlorodisilane can be prepared with only a very small content, if any, of hexachlorodisiloxane. The process according to the invention has the further advantage that the hexachlorodisilane obtained is notable for a high thermal stability, and that no deposits which decompose abruptly with flame formation on contact with the atmosphere can form in the plant.

In the examples described below, all parts and percentages, unless stated otherwise, are based on weight. Unless stated otherwise, the examples which follow are carried out at a pressure of the surrounding atmosphere, i.e. at about 1000 hPa, and at room temperature, i.e. at about 23° C., and at a relative air humidity of about 50%.

In the examples which follow, the content of impurities was determined by gas chromatography.

The term "dried nitrogen" shall be understood hereinafter to mean dried nitrogen with <10 ppbw of moisture, which has been dried, for example, by means of an OMI 4 drying cartridge from Supelco, Bellefonte, USA.

EXAMPLE 1

Distillation Under Standard Pressure

A mixture of 68% tetrachlorosilane and 32% hexachlorodisilane was used. This mixture was introduced into a 1 l glass flask with stirrer and thermometer. Atop the flask was a 100 cm column filled with random packings and with a column head. The reservoir had a temperature of <20° C. The following gas was then used: dried nitrogen. The gas stream was set to 10 l/h by means of a fine valve.

For distillation, the bottom temperature was increased gradually up to 155° C. After removing a first fraction of tetrachlorosilane, hexachlorodisilane was removed in the main fraction at a head temperature of 147 to 148° C.

After cooling to room temperature, analyses of the different main fractions were carried out by means of gas chromatography. The results can be found in table 1.

TABLE 1

|  | Example | | |
| --- | --- | --- | --- |
|  | C1 | C2 | 1 |
| Hexachlorodisilane | 99.297% | 99.596% | 99.671% |
| Hexachlorodisiloxane | 0.023% | 0.013% | 0.006% |

The hexachlorodisiloxane contents correspond to the moisture content of the gas. The compositions additionally contain tetrachlorosilane, trichlorosilane and 2 to 3 unknown substances.

COMPARATIVE EXAMPLE 1

The procedure described in example 1 is repeated, except that the gas used is C1: technical-grade nitrogen with moisture content of approx. 50 ppm.

After cooling to room temperature, analyses of the different main fractions were carried out by means of gas chromatography. The results can be found in table 1.

COMPARATIVE EXAMPLE 2

The procedure described in example 1 is repeated, except that the gas used is

C2: nitrogen dried over drying gel, with moisture content approx. 0.5 ppm.

After cooling to room temperature, analyses of the different main fractions were carried out by means of gas chromatography. The results can be found in table 1.

EXAMPLE 2

Distillation Under Reduced Pressure

A mixture of 68% tetrachlorosilane and 32% hexachlorodisilane was used. This was introduced into a 1 l glass flask with stirrer and thermometer. Atop the flask was a 100 cm column filled with random packings and a column head.

The distillation was performed at a pressure of 200 mbar, which was generated by means of a speed-controlled membrane pump. Before the experiment, the system had been purged with dried nitrogen.

At a pressure of 200 mbar, hexachlorodisilane was removed in the main fraction at a head temperature of 93° C. (bottom temperature 94 to 95° C.). After the experiment had ended, the vacuum was broken with dried nitrogen.

The results can be found in table 2.

The thermal stability of the hexachlorodisilane thus obtained was studied by means of differential scanning calorimetry in a closed system according to TRAS 410 (German Technical Plant Safety Guidelines). The determination was effected both under nitrogen (dew point −80° C.) and under air (50% air humidity). In neither gas atmosphere could any exothermicity whatsoever be found up to a temperature of 400° C.

TABLE 2

|  | Example | |
| --- | --- | --- |
|  | no gas ballast (2) | with gas ballast (C3) |
| Hexachlorosilane | 99.519% | 99.359% |
| Hexachlorodisiloxane | 0.055% | 0.275% |

COMPARATIVE EXAMPLE 3 (C3)

The procedure described in example 2 is repeated, except that an unregulated membrane pump was used and the pressure was set to 200 mbar by adding technical-grade nitrogen through a valve.

At the pressure of 200 mbar, hexachlorodisilane was removed in the main fraction at a top temperature of 93° C. (bottom temperature 94 to 95° C.). After the experiment had ended, the vacuum was broken with technical-grade nitrogen.

The results can be found in table 2.

EXAMPLE 3

A three-neck flask with stirrer and thermometer, which had been connected to a column filled with random packings and of length approx. 100 cm, was again charged with 2400 g of the mixture of tetrachlorosilane and hexachlorodisilane described in example 1. The reservoir was cooled with cooling brine (approx. −20° C.). A vacuum was generated by means of a membrane pump.

Commencement of Distillation:

| Temperature | Bottom | 22° C. |
|---|---|---|
|  | Top | 18° C. |
| Pressure |  | 225 mbar |

Under these conditions, approx. 850 g of tetrachlorosilane were removed as condensate at the top. Subsequently, the temperature was increased slightly and the vacuum was enhanced:

| Temperature | Bottom | 26° C. |
|---|---|---|
|  | Top | 16° C. |
| Pressure |  | 200 mbar |

Under these conditions, a further 450 g of tetrachlorosilane were removed.

Subsequently, the temperature in the bottom was gradually increased to 70° C., the vacuum gradually lowered to 100 mbar. Once these values had been attained, a total of another approx. 500 g of tetrachlorosilane could be removed. Once no further distillate could be obtained under these conditions, the vacuum was broken with dried nitrogen. After cooling from approx. 70° C. to room temperature, a vacuum of 35 mbar was established and the bottom temperature was increased to approx. 45° C. Under these conditions, hexachlorodisilane was removed.

Under these conditions, hexachlorodisilane could be obtained with a purity of 99.76%, a hexachlorodisiloxane content of 0.013% and a tetrachlorosilane content of 0.044%.

COMPARATIVE EXAMPLE 4

A 250 ml Schlenk flask with reflux condenser was charged with approx. 100 ml of hexachlorodisilane (purity 99.09%). This was purged with nitrogen of technical-grade quality (moisture content approx. 50 ppm) above the reflux condenser. The hexachlorodisilane was heated at reflux for approx. 30 hours.

On the glass wall, opposite the nitrogen inlet, a white precipitate formed, which formed sparks when scratched with a spatula. The deposit also ignited after the part had been held in water.

In the case of use of dried nitrogen, no deposit was formed even after a run time of 3 weeks.

This experiment shows that moisture can lead to hazardous hydrolysis products.

The invention claimed is:

1. A process for preparing hexachlorodisilane, comprising distilling a mixture comprising hexachlorodisilane, tetrachlorosilane, and optionally trichlorosilane, wherein water is present during the distillation in an amount of not more than 10 ppbw (parts per billion by weight), and wherein the mixture comprising hexachlorodisilane contains no silanols, or contains silanols in an amount of less than 1 ppbw based on the weight of the mixture.

2. The process of claim 1, wherein the mixture comprising hexachlorodisilane contains trichlorosilane.

3. The process of claim 1, wherein the mixture comprising hexachlorodisilane is a process offgas obtained from the deposition of polycrystalline silicon.

4. The process of claim 2, wherein the mixture comprising hexachlorodisilane is a process offgas obtained from the deposition of polycrystalline silicon.

5. The process of claim 1, wherein the distillation is performed under standard pressure or a minimally elevated pressure.

6. The process of claim 1, wherein water is present in amounts of not more than 5 ppbw.

7. The process of claim 1, wherein water is present in amounts of not more than 1 ppbw.

8. The process of claim 1, wherein tetrachlorosilane is first removed by distillation at reduced pressure, and then hexachlorodisilane is recovered.

9. The process of claim 8, wherein following removal of tetrachlorosilane, hexachlorodisilane is distilled at reduced pressure.

10. The process of claim 9, wherein the purity of the recovered hexachlorodisilane is greater than 99.5% by weight.

* * * * *